Patented Nov. 14, 1933

1,934,989

UNITED STATES PATENT OFFICE 1,934,989

PARASITICIDAL SULPHUR PRODUCT

Alonzo Simpson McDaniel, New York, N. Y., assignor to Loomis, Stump and Banks, New York, N. Y., a partnership No Drawing. Application March 5, 1930
Serial No. 433,515

5 Claims. (Cl. 167—20)

This invention relates to parasiticidal compositions containing colloidal elementary sulphur and more particularly to improved methods for preparing products of the class specified comprising colloidal elementary sulphur and an inorganic water absorptive jell-forming substance such as bentonite, as for example, the product disclosed in United States Patent No. 1,550,650 to Henry W. Banks, 3rd.

Hitherto the bentonite-sulphur products referred to have commonly been prepared by first pulverizing the bentonite and the elementary sulphur and then mixing them together after which this mixture is heated to convert the sulphur into a fluid state and permit the fluid sulphur to be absorbed into the bentonite after which the fluid sulphur is cooled and the fluid sulphur thus solidified in situ in the bentonite.

One of the objects of the present invention is to avoid the necessity of fine grinding or pulverizing the crude bentonite before it is mixed with the pulverized sulphur.

A further object of the present invention is to provide improved methods for converting the sulphur into a fluid state while it is in intimate contact with the bentonite so as to permit the fluid sulphur to be absorbed by and subsequently solidified in situ in the substantially dry bentonite.

These and other important objects of the present invention are obtained by first preparing a liquid or fluid paste comprising bentonite, water and pulverulent sulphur suspended or dispersed in this liquid or paste and subsequently drying this aqueous suspension of bentonite and sulphur and heating the dried or partially dried product thus obtained to convert the sulphur into a fluid state and afterward cooling the product to solidify the fluid sulphur in situ in the bentonite.

Preferably the liquid or fluid paste comprising the bentonite and suspended sulphur is first atomized or otherwise converted into relatively small droplets or small fluid particles of about 1/200 inch diameter or less and these droplets or small fluid particles dried by bringing them into intimate contact with a substantially dry hot gas such as ordinary air for a sufficient period of time to convert the droplets or fluid particles into a substantially dry solid state and to melt the sulphur, the temperature of the dry hot gas being above the melting point of the sulphur. In accordance with this preferred procedure the drying of the aqueous liquid or fluid paste containing the bentonite and suspended sulphur and the melting or vaporization of the sulphur are carried out in one continuous step of the process or substantially simultaneously and, at the same time, after cooling to solidify the fluid sulphur in situ in the bentonite, the final product is obtained in a sufficiently finely divided form for direct application to plants by the dusting method to control the parasitic diseases thereof.

It will be understood however that the aqueous liquid or fluid paste (containing the bentonite and suspended sulphur) may be heated in any convenient manner to dry the product and to melt or vaporize the sulphur in one substantially continuous step without departing from the present invention. Also the drying of the liquid or fluid paste (containing the bentonite and suspended sulphur) and the melting or vaporization of the sulphur may be carried out in successive steps likewise without departing from the invention, whether the liquid or fluid paste be first atomized or not.

The following example is given to illustrate one embodiment of the invention:

Example I

Crude partially dried bentonite clay in lump or granular form of about the size of ordinary peas or roughly ⅛ inch in diameter, is mixed in any convenient manner with finely pulverized sulphur preferably of a degree of fineness such that 90 percent or more of the sulphur will pass a two hundred mesh screen. This mechanical mixture of lump or granular bentonite and pulverized sulphur is now made into a liquid or fluid paste by the addition of water to the mixture and stirring. The proportion of water added is determined by the consistency desired in the paste. For a paste of the consistency of thick cream and where the highest grade bentonite, such as Wilkinite, is employed, the amount of water required is ordinarily four or five times the weight of the bentonite. It is usually advisable to add the water in two or three successive portions of equal amounts, allowing several hours time between the addition of the different portions of the water to permit the water to thoroughly penetrate the lumps or granules of bentonite and convert them into a jelly of substantially uniform consistency before the addition of the succeeding portions of water. During the addition of the first and frequently also of the second portion of the water, depending upon the grade of bentonite employed, the mixture may become too stiff in consistency to stir conveniently and when this happens the mixture is simply allowed to stand without stirring until the water penetrates the bentonite before adding the succeeding portions of water. When the paste or jelly becomes sufficiently fluid in this manner to stir conveniently the succeeding portions of water may be added with stirring. After sufficient water has been added in this manner to produce liquid or fluid paste of about the consistency of thick cream, the paste or suspension of bentonite and sulphur is pumped under pressure through a spray nozzle into a current of hot dry gas such as ordinary air. Preferably the nozzle comprises a plurality of small openings leading into a central chamber, the openings being about 1/200 inch in diameter or less. The liquid is forced downwardly from the nozzle into the current of hot dry gas which likewise flows downwardly in a spiral path. The temperature of the hot dry gas is preferably between about 500° and 650° F. It will be understood of course that the liquid or fluid paste as it leaves the nozzle or nozzle head is broken up or atomized into liquid or fluid droplets or particles having a diameter roughly corresponding to the diameter of the openings of the nozzle head. These droplets or fluid particles are caught up by the current of hot gas and carried downwardly in a spiral path with the hot gas. The length of the spiral path of the hot gas should be sufficiently long to permit the water to evaporate from the droplets to a sufficient extent to convert the droplets into substantially solid particles and also to permit the heat from the hot gas to penetrate the substantially solid particles to a sufficient extent to melt the sulphur contained in the particles, thus permitting the fluid sulphur to be absorbed by the substantially solid bentonite particles. In this state the particles have a somewhat pasty consistency due to the fluid sulphur and therefore they are cooled to solidify the sulphur by causing the current of gas carrying the particles to pass through a conduit cooled externally in any convenient manner as by means of the surrounding atmospheric air. The cooled, substantially solid particles are now separated from the current of gas in any convenient manner as by means of a dust collector of the cyclone type wherein the dust laden gas passes upwardly in a spiral path through a cone shaped hopper provided with an opening at the bottom for collecting the dust which settles out and with an opening at the top for the exit of the gas from which the dust has been removed.

The entire process of atomizing and drying the liquid or fluid paste and at the same time fusing the sulphur and the particles may be carried out in the type of apparatus commonly used in the spray drying of liquids or aqueous suspensions.

As previously indicated the invention is not limited to the specific details set forth in the preceding example but various changes may be made as to the specific details without departing from the true scope of the invention as set forth in the claims.

Thus for example the liquid or fluid paste may be dried without atomizing as specified in the above example, as for instance by means of a drier of the rotating drum type in which the material is permitted to flow over the exterior surface of the drum and is heated by means of steam contained inside the drum. When using this latter method for drying the liquid or fluid paste containing bentonite and sulphur, the temperature of the steam inside the drum must of course be sufficiently high to dry the bentonite and melt the sulphur in the material during the time that the mixture is allowed to remain in contact with the drum before being scraped off. When a drum drier is used for drying the paste it will be obvious of course that the dried fused product after removing from the drum must be ground to a sufficiently fine powder or dust to enable it to be applied to plants by the dusting method if the product is to be used for this purpose, whereas the product obtained in the example described above is already in a state of sufficiently fine subdivision to be used for this purpose.

The size of the particles of bentonite may vary from the size specified in the example without departing from the invention. Thus extremely coarse lumps of several inches in diameter or more may be employed to advantage or the bentonite may of course be powdered to any desired degree of fineness likewise without departing from the true scope of the invention. However, as already stated, one of the principal objects of the invention is to avoid extremely fine grinding of the bentonite which is a costly and inconvenient operation and for this reason I prefer to employ the coarse or granular type bentonite. When however extremely finely ground bentonite is employed in the process set forth in the example the final product obtained does not have to be ground further to adapt it for use for application to plants by the dusting method. Also the process of melting the sulphur as set forth in the example is much more rapid than the methods hitherto known for accomplishing the same result. Therefore there are numerous advantages in conducting the process by the method set forth in the example even though finely ground bentonite is employed.

Instead of drying the liquid or fluid paste and melting the sulphur in substantially one continuous step as set forth in the example, these two operations may be carried out in successive steps without departing from the invention as already stated. Thus for instance the suspension or paste of bentonite and sulphur may be atomized and dried by the spray drying method without fusing the sulphur and the resulting spray dried product may be heated in any convenient manner to a sufficient temperature to melt the sulphur in the particles and then cooled to solidify the sulphur in situ in the particles. If the process is carried out by the two step method I prefer to melt the sulphur in the particles by sifting them into a current of hot gas having a sufficiently high temperature to melt the sulphur. This second step may be conducted in the same type of apparatus as that described in the example except that a sifter is substituted for the nozzle.

It will be understood of course that the invention comprises an improved product as well as an improved method of making the older product described in the Banks Patent No. 1,550,650 already referred to. The improved product produced or resulting from the method set forth in the example possesses novel and advantageous properties particularly with respect to the ease and speed with which it may be dissolved or dispersed in water to produce a milky suspension or dispersion of colloidal sulphur in water suitable for application to plants by the liquid spray method as distinguished from the dusting method. Thus the product obtained in the example may be used without further change either as a dust or as a liquid spray in applying the material to plants. In some instances however it is advantageous to break up or atomize the liquid or fluid paste into larger droplets than those mentioned in the example so as to produce a product consisting of dried particles of larger size, say for instance of a size such that most of it will pass a 50 mesh screen but will fail to pass a 100 mesh screen. A somewhat coarser product of this character disperses or dissolves even more readily in water to produce a milky suspension for spraying purposes. In this connection it should perhaps be explained that the product described in Banks Patent No. 1,550,650 tends to form pasty lumps with a protective gelatinous coating when an attempt is made to disperse or dissolve this product in water for spraying purposes. The exact cause of this effect is not entirely understood but it is believed to be due to a lack of porosity in the particles of the material whether finely ground or coarsely ground. The improved product of the present invention on the other hand produced by the atomizing process set forth in the example possesses a high degree of porosity with respect to each particle so that when the material is brought into contact with water the water readily and quickly penetrates throughout the body of each particle, thus preventing the formation of a sticky gelatinous coating on the surface of the particles which apparently causes them to agglomerate and form the sticky, pasty lumps already mentioned when it is attempted to dissolve or disperse the material in water.

When finely pulverized bentonite is employed in place of the coarse granular bentonite specified in the example it is sometimes advantageous in preparing the liquid or fluid paste to float the mixture of finely ground bentonite and sulphur on the surface of the water, stirring the water beneath the layer of powder on the surface of the water in any convenient manner so as to produce currents of water between the bottom of the container and the surface of the water. In this manner a thin milky dispersion of the mixture of bentonite and sulphur in the water can be prepared more rapidly than by the method specified in the example but of course a thick creamy paste cannot conveniently be prepared in this manner.

While the improved product of the present invention is especially adapted for use as a parasiticide it is also useful for many other purposes for which colloidal sulphur is generally adapted. Thus the improved product may be used for controlling the parasitic diseases of animals and human beings as well as for the purposes already specified. Examples of these other uses are as a sheep dip, as a hair tonic or hair wash, as a salve (made up either with water or oil) and as a bath powder for preparing sulphur baths.

In order to further improve the properties of the product of the present invention, particularly with respect to its property of readily and quickly dissolving and dispersing in water, a wetting agent may be added to the liquid or fluid paste before drying. For this purpose I prefer to use soap and preferably a soap which is free from uncombined alkali. The amount of soap added may vary from about 1 percent to about 50 percent by weight of the bentonite used in making up the paste. Other wetting agents which are suitable for this purpose are casein glue, calcium caseinate, water glass (in relatively small proportions) and in fact any agglutinant which is compatible with the bentonite and which is not damaged by the temperature to which the paste is subjected in drying.

Also in some instances a heavy filler may be added to the paste before drying for the purpose of increasing the density of the finished dry material so that it will sink in water instead of floating upon the surface of the water. Frequently the product of the present invention when loaded with a heavy filler disperses and dissolves more readily in water than it does when a filler is absent. I have found that lead arsenate is a suitable filler for this purpose but any convenient loading material may be added provided it is compatible with the remaining constituents of the paste or is inert.

It will be understood of course that in order to further reduce the particle size of the ground sulphur in the paste, the paste itself may be subjected to a grinding operation as for instance by running it through a colloidal mill before drying the paste and melting the sulphur in accordance with the method of the present invention.

One of the advantages of the method of the present invention not previously mentioned specifically is that it enables one to use lower grades or qualities of bentonite, or in other words bentonite containing non-colloidal or non-gelatinous impurities such as ordinary clay, sand, sediment and the like. In this connection it will be obvious of course that these impurities can be readily separated from the liquid or fluid paste by decantation or sedimentation or in any other convenient manner before the paste is dried and fused in accordance with the present invention.

I claim:

1. In the method of preparing parasiticidal colloidal sulphur the steps which comprise suspending pulverulent sulphur in a medium comprising water and bentonite and subsequently drying the composition thus obtained and heating the sulphur in the dried product to a temperature above its melting point to convert it to a fluid state and maintaining the heating for a sufficient time to permit the fluid sulphur to be absorbed by the dried product and then cooling the sulphur to a temperature below its melting point to solidify the fluid sulphur in situ in the dried product.

2. In the method of preparing parasiticidal colloidal sulphur the steps which comprise suspending pulverulent sulphur in a medium comprising water and bentonite and subsequently drying the composition thus obtained and heating the sulphur in the dried product to a temperature above its melting point to convert it to a fluid state maintaining the heating for a sufficient time to permit the fluid sulphur to be absorbed by the dried product and then cooling the sulphur to a temperature below its melting point to solidify the fluid sulphur in situ in the dried product, the said operations of drying the composition and converting the sulphur into the fluid state being performed substantially simultaneously.

3. In the method of preparing parasiticidal colloidal sulphur the steps which comprise suspending pulverulent sulphur in a medium comprising water and bentonite and subsequently converting the liquid suspension thus obtained into liquid droplets and bringing the liquid droplets into intimate contact with a dry gas for a sufficient length of time to convert the liquid droplets into substantially dry solid particles and subsequently heating the sulphur in the substantially dry solid particles thus obtained to a temperature above its melting point to convert it into a fluid state and cooling the sulphur to a temperature below its melting point to solidify the fluid sulphur in situ in the particles.

4. In the method of preparing parasiticidal colloidal sulphur the steps which comprise suspending pulverulent sulphur in a medium comprising water and bentonite and subsequently converting the liquid suspension thus obtained into liquid droplets and bringing the liquid droplets into intimate contact with a substantially dry gas, the temperature of a portion at least of the dry gas being above the melting point of the sulphur, the contact between the dry hot gas and the liquid droplets being maintained for a sufficient length of time to convert the liquid droplets into substantially dry solid particles and to liquefy the sulphur and subsequently cooling the sulphur to a temperature below its melting point to solidify the fluid sulphur in situ in the particles.

5. A parasiticidal composition in a pulverulent form comprising bentonite and sulphur solidified from a fluid state in situ in the bentonite, the major portion of the particles of the bentonite containing the solidified sulphur being less than about one-fiftieth of an inch in diameter and greater than about one-one hundredth of an inch in diameter.

ALONZO SIMPSON McDANIEL.